US006989083B2

(12) United States Patent
Takikawa et al.

(10) Patent No.: US 6,989,083 B2
(45) Date of Patent: Jan. 24, 2006

(54) METHOD FOR PREPARING CARBON NANO-FINE PARTICLE, APPARATUS FOR PREPARING THE SAME AND MONO-LAYER CARBON NANOTUBE

(75) Inventors: Hirofumi Takikawa, Aza Uehara 1-3 (1-104), Ogasaki-cho, Toyohashi-shi, Aichi-ken (JP); Mitsukuni Ikeda, Toyohashi (JP); Shigeo Itoh, Mobara (JP); Tomonori Tahara, Tokyo (JP)

(73) Assignees: Hirofumi Takikawa, Aichi-ken (JP); Futaba Corporation, Chiba-ken (JP); Tokai Carbon Co., Ltd., Tokyo (JP)

( * ) Notice: Subject to any disclaimer, the term of this patent is extended or adjusted under 35 U.S.C. 154(b) by 28 days.

(21) Appl. No.: 10/407,666

(22) Filed: Apr. 4, 2003

(65) Prior Publication Data

US 2003/0188963 A1 Oct. 9, 2003

(30) Foreign Application Priority Data

Apr. 5, 2002 (JP) ........................ 2002-103825

(51) Int. Cl.
*C01B 31/00* (2006.01)
*C23C 14/34* (2006.01)

(52) U.S. Cl. .............. 204/173; 204/192.38; 204/298.41
(58) Field of Classification Search ............ 204/192.38, 204/173, 298.41, 298.23
See application file for complete search history.

(56) References Cited

U.S. PATENT DOCUMENTS

2002/0179428 A1 * 12/2002 Anazawa et al. ........... 204/173

FOREIGN PATENT DOCUMENTS

JP            2001064004           3/2001

OTHER PUBLICATIONS

Ikeda et al., "Preparation of Carbon Nanohorn Aggregates By Cavity Arc Jet In Open Air", Japanese Journal of Applied Physics, 41, L852 (2002).
Murata et al., "Pore Structure Of Single-Wall Carbon Nanohorn Aggregates", Chemical Physics Letters, vol. 331, pp. 14–20 (2000).
Saito et al., "Basis of Carbon Nanotube", pp. 37–42, Corona Publishing Co., ltd. (1998).
Iijima et al., "Nano-Aggregates Of Single-Walled Graphitic Carbon Nano-Horns", Chemical Physics Letters, vol. 309, pp. 165–170 (1999).

* cited by examiner

*Primary Examiner*—Steven VerSteeg
(74) *Attorney, Agent, or Firm*—Quarles & Brady LLP

(57) ABSTRACT

A graphite cathode and a graphite anode are placed opposite each other through an insulating plate having a notch. A voltage is applied between both of the electrodes to generate arc discharge at the notch of the insulating plate. A given area of the graphite anode is evaporated from an electrode point of the arc discharge, and simultaneously an arc jet is generated from the notch. Thereby, a carbon nanoparticle comprising soot of carbon nanomaterial containing carbon nanohorn is generated. The soot is deposited on a recovering plate for recovery.

15 Claims, 14 Drawing Sheets

10 mm 10 mm 10 mm

METHOD FOR PREPARING CARBON NANO-FINE PARTICLE, APPARATUS FOR PREPARING THE SAME AND MONO-LAYER CARBON NANOTUBE

CROSS REFERENCES TO RELATED APPLICATIONS

Not Applicable

STATEMENT REGARDING FEDERALLY SPONSORED RESEARCH

Not Applicable

BACKGROUND OF THE INVENTION

1. Field of the Invention

The present invention relates to a method for effectively preparing at low cost a nanoscale size ($10^{-6}$–$10^{-9}$) particle comprising a carbon nanohorn or extremely short monolayer carbon nanotube containing carbon, such as, graphite, activated carbon, amorphous carbon, resin etc., as main components and an apparatus for preparing the same. The present invention is particularly applicable to the production of a mixture for a secondary battery electrode or fuel battery electrode. The present invention also relates to a novel nanocarbon substance.

The term "carbon nanohorn" used herein is a carbon nanoparticle having a shape of a graphite sheet that is rounded conically with a closed peak (see: Unexamined Japanese Patent Publication (Kokai) No. 2001-64004).

The term "extremely short mono-layer carbon nanotube" used herein is defined as a mono(single)-layer carbon nanotube having a length several times to several tens times the diameter. Concretely, it is a nanometer size mono-layer tube having a diameter of 0.7 nm to 5 nm and length of 3 nm to 100 nm comprising a graphite sheet having a carbon six-membered ring as a main structure. By virtue of such size, the extremely short monolayer carbon nanotube is suitable for a capsule of nano-fine particle (a magnetic fine-particle encapsulated anticorrosive magnetic material, fine-particle for magnetic memory, arithmetic element by mobile of encapsulated fine particle, etc) or ion conductor, such as an electrolyte particularly for fuel battery, provided chemical modification of surface is required in case of ion conductor.

Similarly, the term "carbon nano-fine particle" used herein is defined as a fine particle comprising, as a constituting member, a carbon nanomaterial, such as a carbon nanohorn or extremely short mono-layer carbon nanotube. This is because the carbon nanohorn or extremely short mono-layer carbon nanotube do not exist independently, but they aggregate in fine particle. Further, a fullerene, nanopolyhedron, mono-layer nanocapsule, nanographite piece, foamed carbon exist as fine particles. Furthermore, there is a case where a long mono-layer carbon nanotube, multi-layer carbon nanotube exists.

The fullerene, and nanocapsule as well as extremely short carbon nanotube are considered as the same material. One difference among them is size. The size of the mono-layer nanocapsule or extremely short carbon nanotube is larger than that of the fullerene. The difference between the mono-layer nanocapsule and extremely short monolayer carbon nanotube is that the main part of the latter is a straight tube or may be continuously connected tubes having different diameters, while the former nanocapsule is not necessarily straight, but closed like a shell.

Similarly, the term "nanocarbon material" used herein is defined as a monolayer carbon nanotube, multi-layer carbon nanotube, carbon nanofiber, carbon nanohorn, fullerene, or mixture thereof.

2. Description of the Related Arts

The carbon nanohorn is a conical-shaped carbon nanomaterial (see Unexamined Japanese Patent publication No. 2001-64004.) The carbon nanohorn is produced in aggregate. The size of aggregated fine particle of the carbon nanohorn is approximately 100 nm.

The carbon nanohorn is usually produced by means of laser evaporation of solid graphite single substance (see Unexamined Japanese Patent publication No. 2001-64004). Such a process is as described below:

A solid graphite single substance is placed in a hermetically sealed container for a process. The container is evacuated to $10^{-2}$ Pa and below and is charged with an inert gas such as Ar etc. to reach an atmosphere of $10^3$ to $10^4$ Pa. The hermetically sealed container is provided with a glass window through which a laser passes. The solid graphite single substance is irradiated with a laser, such as carbon oxide gas ($CO_2$) laser and the like, through the glass window. By virtue of irradiation with the $CO_2$ laser, the surface of the solid graphite single substance is evaporated to form soot-like substance. An aggregated fine particle of carbon nanohorn exists in the soot-like substance.

2. Problems to be Solved by the Invention

The problems associated with the conventional method for preparing carbon nanohorn by laser evaporation are as describe below.

1) A vacuum container, evacuating apparatus, laser-introducing vacuum window and $CO_2$ laser are necessary. Apparatus cost is relatively high. In particular, a $CO_2$ laser is high expensive.

2) Since the production process is carried out in an Ar gas-charged hermetically sealed container, it is not suitable for continuous mass production.

3) Evacuation, Ar gas introduction, and opening to air must be repeated. Production process is long.

4) When the window for introducing the laser is contaminated with carbon soot, cleaning the window must be repeated frequently because graphite material is not irradiated with a laser having the desired power. Accordingly, the equation of conditions is difficult and such a conventional method is not suitable for continuous mass production.

SUMMARY OF THE INVENTION

A principal object of the present invention is to provide a method of producing carbon nano-fine particle (including a mass production) containing about 20% and above of carbon nanohorn fine particles easily and at low cost in which a process container is not always necessary and a carbon material is evaporated by the use of arc jet generated in air, and an apparatus for preparing the same. Further object of the present invention is to provide a novel nanocarbon substance.

In accordance with an aspect of the present invention, there is provided a method of preparing a carbon nano-fine particle which comprises the steps of placing a first electrode and a second electrode of carbon as a main component opposite each other through an insulating member having at least one notch, applying a voltage between the first electrode and the second electrode to generate arc discharge at the notch between the first electrode and the second electrode opposite each other in the atmosphere or air, evaporating the carbon material of the second electrode by the arc discharge to generate arc jet containing the carbon material from the notch, and cooling the arc jet to form soot containing a carbon nanomaterial. The carbon material of the second electrode is evaporated from an electrode point of the arc discharge. Alternatively, the carbon material of the second electrode is evaporated by the arc discharge while relatively moving the first electrode and the second electrode. The method of preparing a carbon nano-fine particle of the present invention, further includes a step for recovering the soot containing the carbon nanomaterial by placing a substrate opposite to the arc jet to recover the soot containing the carbon nanomaterial through the substrate. According to the present invention, the arc jet is generated while applying a magnetic field to the arc discharge, and the arc discharge is performed while supplying a specific gas to the arc discharge and cooling the first and second electrodes. The specific gas is selected from the group consisting of rare gas, carbon-containing gas, oxygen gas, hydrogen gas, air, atmosphere and mixture thereof.

Further in accordance with the present invention, there is provided an apparatus for preparing a carbon nano-fine particle which comprises a set of electrodes formed of a first electrode and a second electrode of carbon material as a main component which are held in a given space through an insulating member having at least one notch in the atmosphere, air or a specific gas, an arc discharge generator for applying a voltage between the first electrode and the second electrode to generate the arc discharge by which the carbon material is evaporated to generate an arc jet containing the carbon material from the notch, and a recovering member for recovering soot containing the carbon nanomaterial formed by cooling the arc jet. The apparatus further includes a moving device for relatively moving the first electrode and the second electrode, and a voltage is applied between the first electrode and the second electrode while moving the first electrode and the second electrode to generate the arc discharge by which the carbon material is evaporated to generate soot containing carbon nanomaterial. The recovering member comprises a substrate which is supported by a holder subjecting the substrate to direct to the arc jet, and the soot containing the carbon nanomaterial is recovered through the substrate. The apparatus further includes a magnetic field applying member for applying a magnetic field to the arc discharge to generate the arc jet, a specific gas supplying member for supplying a specific gas to a generating area of the arc discharge, and a cooling member for cooling the first electrode and the second electrode.

Still further in accordance with the present invention, an extremely short mono-layer carbon nanotube having a diameter of approximately 0.7 nm to 5 nm and a length of approximately 3 nm to 100 nm can be obtained.

BRIEF DESCRIPTION OF THE DRAWINGS

In the description, reference is made to the accompanying drawings which form a part hereof, and in which there is shown by way of illustration a preferred embodiment of the invention.

DETAILED DESCRIPTION OF THE PREFERRED EMBODIMENTS

Figure 1A:
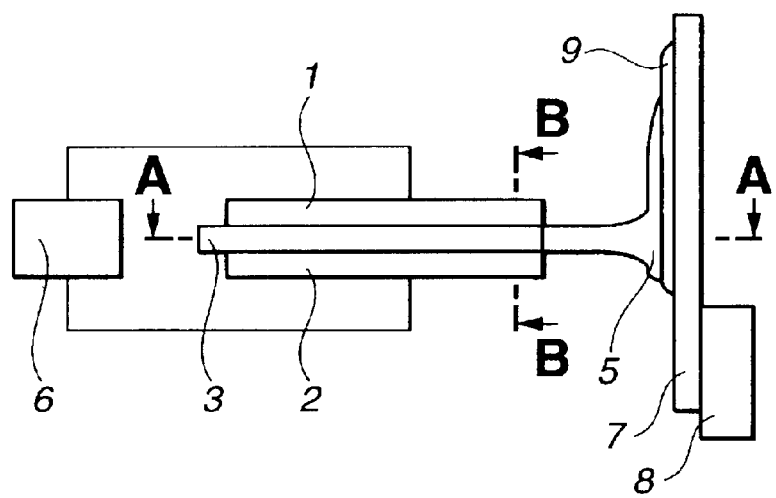
FIG. 1(a) is a schematic illustration of a first example of an apparatus used for preparing a carbon nano-fine particle (basic type of the present invention.)

The present invention produces a carbon nano-fine particle containing carbon nanomaterial, such as carbon nanohorn etc., by arc discharge between a plurality of electrodes of graphite etc. in the open atmosphere, air or a specific gas in such a manner as described below.

Two electrodes are placed opposite each other through an insulating member having at least one notch in the open atmosphere or air. A voltage is applied between the two electrodes to generate an arc discharge in the space formed at the notch of the insulating member. At this time, when the space formed by the two electrodes and the notch of the insulating member is sufficiently narrow, a circular cathode point formed by the usual arc discharge disappears. That is to say, the boundary between arc positive column plasma and a cathode, that is, a passage of electric current formed on the surface of the cathode which is a place for receiving an electron stream disappears. As a result, a cathode point becomes enlarged over the whole surface of the electrode which is not covered with the insulating member.

Under such a state, the pressure of the space between the two electrodes and the insulating member is higher than atmospheric pressure by vigorous evaporation (evaporation pressure) by a high temperature of the arc of between about 4000K and about 20000K and the second electrode, mainly by an evaporation pressure of carbon material of the second electrode. This pressure is 105% to 200% of atmospheric pressure, that is, approximately 105 kPa to 200 kPa. As a result, an arc jet is jetted from the notch part (nick part) of the insulating member. The term "arc jet" used herein means such plasma as the plasma generated by the arc discharge is jetted to the space other than those on the shortest line joined between two electrodes. When a magnetic field is applied to the arc discharge by the use of a magnetic field applying member under such a state, the plasma generated by the arc discharge is curved by the magnetic field applied. Consequently, the arc jet is jetted from the notch of the insulating member. Alternatively, when a specific gas is supplied to an arc discharge generating zone by the use of a specific gas supplying member, the arc is pushed out toward an injecting hole by the specific gas supplied. In such a case as described above, two or more of the above-described three methods for jetting an arc jet from the notch of the insulating member can be naturally combined.

The main component of the arc jet is carbon. Further, evaporated particles of electron and insulating material or the air or atmosphere other than carbon is mixed in the arc jet. When the arc jet is cooled outside the space where the arc jet is formed, a carbon nano-fine particle containing a carbon nanomaterial such as carbon nanohorn etc. is formed.

The term "cooling" used herein means that the arc jet is jetted into a specific atmosphere comprising the air or atmosphere or specific gas or mixed gas thereof to allow the arc jet to come into contact with the specific atmosphere, thereby decreasing the temperature of the arc jet. Or, such term "cooling" means that the arc jet is allowed to contact with a base material, thereby decreasing the temperature of the arc jet by the base material. Further, such term "cooling" means that the above-defined cooling methods are combined to decrease the temperature of the arc jet.

When the space formed between two electrodes and the notch of the insulating member is wide, for example, when the notch is large or the insulating member is thick, a cathode point remains a typical minute circular shape having a diameter of about 4 nm maximum. In this case, the arc jet is not appreciably formed, and fine particles containing carbon nanohorn is hardly formed.

An arc voltage when the arc jet is formed is decreased compared to when the arc jet is not formed. This is because when the arc jet is formed, a cathode point becomes enlarged to decrease the resistance on the surface of the cathode, and hence, the anode fall voltage decreases.

Since a whistle sound is generated when an arc jet is formed using an electrode structure having an insulating member sandwiched for producing a carbon nanohorn and the like, the method of the present invention is called "whistle arc jet method". The whistle sound is on a level beyond the range of human hearing. The whistle sound is not so high tone, but a continuous high-pitched tone such as "beep". Contrary to this, the arc jet is not appreciably formed and particles containing carbon nanohorn are hardly formed in such a case where the whistle sound is not generated. In such a case, discontinuous sounds such as "clap-clap-clap" are generated. Two electrodes and the notch of insulating member form a cavity. According to such a shape, the method of the present invention is called "cavity arc jet" (M. Ikeda, H. Takikawa, T. Tahara, Y. Fujimura, M. Kato, K. Tanaka, S. Itoh, T. Sakakibara: "Preparation of carbon nanohorn aggregates by cavity arc jet in open air", Japanese Journal of Applied Physics, 41, L852(2002))

The present invention will be understood more readily with reference to the following examples. However, the present invention is not intended to be limited to the following examples and variations may be made by those skilled in the art. A plurality of the following examples Nos. 1 to 8 may be used in combination.

In the following examples, a general-purpose electric source for arc welding is used. An insulating plate having a notch is sandwiched between two carbon electrodes. An arc discharge is generated from the notch to vigorously evaporate the cathode carbon material. Then, an arc jet is generated from the notch which collides with a recovering member to form carbon nano-fine particles as soot.

Figure 1B:
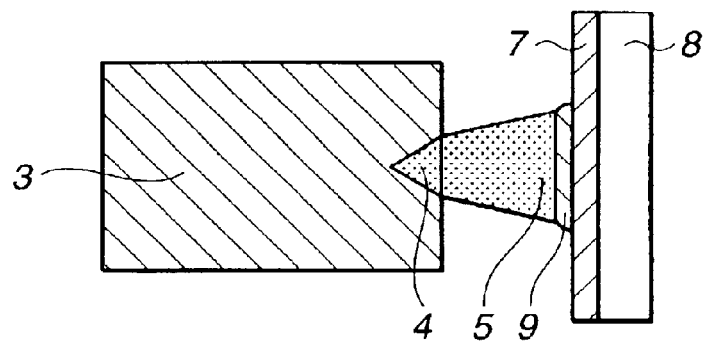
FIGS. 1(b) and (c) are cross section of FIG. 1(a)
Figure 1C:
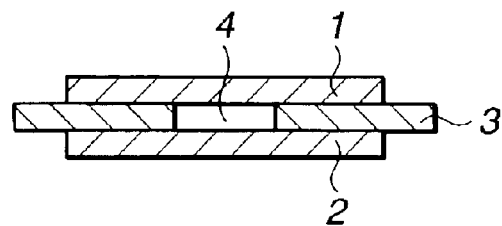

Example 1 is describe below with reference to FIG. 1. FIG. 1(a) is a schematic illustration of an apparatus used in example 1 for preparing a carbon nano-fine particle. FIG. 1(b) is a cross section taken along a plane A—A of FIG. 1(a). FIG. 1(c) is a cross section taken along a plane B—B of FIG. 1(a).

As shown in FIG. 1, the apparatus of the present invention comprises a cathode 1 of graphite as a first electrode, an anode 2 made of carbon material, such as graphite, active carbon, amorphous carbon, resin, etc., placed opposite the cathode 2, an insulating plate 3 placed between the cathode 1 and anode 2, the notch 4 formed in the insulating plate so as to expose the cathode 1 to the anode 2 oppositely, a welding electric source 6 for applying voltage between the cathode 1 and anode 2 to generate an arc jet (arc) 5 by arc discharge, thereby evaporating the carbon material of the anode 2 to generate soot containing carbon nanomaterial, a substrate (base plate) 7 of stainless steel etc. placed opposite the arc jet 5 and functioning as a recovering member for depositing the soot, and a base stage 8 as a holding member for fixing and holding the substrate 7. Reference numeral 9 is carbon nano-fine particle comprising soot containing carbon nanomaterial deposited on the substrate 7. The invention can employ other apparatus for practicing the invention, such as apparatus applying a contact arc, high voltage application, high radio-frequency application, and the like.

The cathode 1 and anode 2 are placed opposite each other in the air in the atmosphere to generate an arc discharge in the air in the atmosphere. The place where the cathode 1 and the anode 2 are placed or the place where the arc discharge is generated is not necessarily in the air, but may be in an atmosphere of inert gas such as Ar, He, etc., or in an atmosphere of inert gas such as $O_2$, $N_2$, $H_2$, or in an atmosphere of carbon-containing gas such as hydrogen carbide gas, carbon dioxide gas, etc. or in an atmosphere of the aforementioned gas mixed gas including air and atmosphere. Further, the place where the cathode 1 and the anode 2 are placed or the place where arc discharge is generated may be under reduced pressure (approximately 50 kPa~200 kPa) or under pressure. Atmospheric air, however, is preferred because it is simple and inexpensive.

The term "air" used herein is defined as gas comprising nitrogen and oxygen approximately at a ratio of 4:1 including trace amounts of Ar, etc. In general, it means dry air from which is removed moisture. The wording "in the air" used herein means, for example a pressure of approximately 50 kPa to 150 pKa.

Similarly, the term "atmosphere" used herein are gases surrounding heavenly bodies and mainly gases surrounding the earth. Gas surrounding the earth is a mixture of nitrogen and oxygen as main components, and minute amounts of carbon dioxide, neon, helium, methane, hydrogen, etc. It contains also water vapor. That is to say, it is a mixture of air with water vapor generated naturally. The wording "in the atmosphere" or "in open air" or "under open air" includes the pressure of atmospheric pressure or thereabout, for example, about 90 kPa to 110 kPa.

A container is not necessary to practice the invention. However, the entire apparatus including a working part may be placed in a simple container as a covering means in order to keep the working place clean or in order to carry out in an inert gas or in order to prevent influence by convection caused by wind etc. Such a simple container may be a vacuum container, pressurized container, closed container or open container.

The arc discharge comprises an arc electrode point (cathode point and anode point in the case of direct electric current) and an arc positive column anode. The electrode point is a boundary between an arc positive column anode, that is plasma (ionized gas), and a solid electrode.

The arc discharge may be carried out by any modes such as direct current (DC), direct current pulse (DCP), alternating current (AC), alternating current pulse (ACP), etc. When the arc discharge is generated by DC or DCP mode, the anode 2 is evaporated in high volume, while the cathode 1 is hardly evaporated. On the other hand, when the arc discharge is generated by AC or ACP mode, both electrodes of the cathode 1 and the anode 2 are evaporated. However, DC mode can form the most stable arc jet and produce the most plenty of carbon nanoparticles. A certain amount of the arc jet 5 can be generated by AC. Since the polarities of the anode 2 and the cathode 1 are reversed periodically, an electrode point of one of both electrodes does not become enlarged. As a result, the amount of evaporation by AC mode is small and the length of the arc jet 5 is shortened, thereby decreasing the amount of production.

When both of the cathode 1 and anode 2 are formed of material comprising, as a main component, carbon such as graphite, active carbon, amorphous carbon, resin, etc., and arc discharge is generated by DC or ACP mode, both of the cathode 1 and anode evaporate alternatively. In the example described herein after, the arc discharge is operated by DC.

A graphite electrode as the cathode 1 and the anode 2 is graphite free from impurities. When graphite doped with metal fine particles is used as an anode, the amount of evaporation is increased and the amount of production of carbon nano-fine particles is increased. This is because the evaporation of metal fine particles having an evaporation temperature lower than that of graphite accelerates evaporation of the surrounding graphite. The fine metal particle used in the present invention may be those of Ni, Y, Fe, Cu, etc. In the present invention, the graphite doped with different metals is also used. In particularly, the graphite doped with Ni fine particle (4 mol %) and Y fine particle (1 mol %) is proper and generates an extremely large amount of soot.

However, when graphite free from impurities is used, the yield of carbon nanohorn fine particle is high. This is because a catalyst is not necessary basically for production of carbon nanohorn. Laser evaporation makes use of pure graphite. When graphite contains impurities, that is, catalyst fine particle, the amount of carbon deposited on the catalyst metal is increased. That is to say, it is considered that rate of carbon capable of being carbon nanohorn decreases. However, in relation to the amount of production per unit time, a graphite electrode of graphite doped with Ni and Y the amount of evaporation of which is extremely large is preferable.

The thickness of the insulating plate 3 as an insulating member is not particularly defined, but is preferable in the range of 0.2 nm to 5 nm in order to generate an arc discharge by the use of the general-purpose arc electric source 6. Further, a plate thickness in the range of 0.2 nm to 2 nm is preferred in order to generate the arc jet 5. The shape of the notch 4 of the insulating plate 3 may be different types of shapes such as square, arc, triangle, etc. In the case of these shapes, the shape of the opening of the arc jet 5 is wide or same. In particular, triangle is easy to process. Of course, the triangle may be used as an inverted triangle to lessen the opening.

The depth of the notch 4 of the insulating plate 3, that is, the distance from the spout hole of arc jet is not particularly specified. The width of the notch 4, that is, the width of the spout hole of arc jet is not particularly specified. Since, however, a graphite anode is hardly evaporated; the depth and width of the notch are preferably shallow and narrow, respectively. Since the Ni- and Y-doped graphite cathode is easily evaporated, the depth and width of the notch may be wide.

When arc current is 100 A to 200 A and below, the depth and width of the notch are preferably 20 mm and below, and 15 mm and below, respectively. More preferably, they are 10 mm and below, and 5 mm and below, respectively. When the depth and width of the notch are above them, only a part of electrode to be evaporated is evaporated. When arc current is 200 A to 300 A, the depth and width of the notch are preferably 25 mm and below, and 20 mm and below, respectively. More preferably, they are 15 mm and below, and 10 mm and below, respectively.

It is preferable that the arc current is higher. When it is above 300 A, the insulating plate 3 is easy to melt because the temperature on the surface of the insulating plate 3 facing arc is approximately several hundreds ° C. Accordingly, the arc current is preferably 300 A and below. When the arc current is 50 A and below, the arc jet is hardly generated.

The insulating plate 3 comes into close contact with the cathode 1 and anode 2 in order to define the space between the cathode 1 and anode 2 and the direction of the spout of arc jet 5. It is not preferable, however, to allow the insulating plate 3 to adhere completely to the cathode 1 and anode 2.

The insulating plate 3 has an area larger than those of the cathode 1 and anode 2. That is to say, the insulating plate 3 projects out from the gap between the cathode 1 and anode 2 in order to prevent the arc discharge from generating at a place other than desired place. Of course, the insulating plate 3 can safely have the same area as the cathode 1 and anode 2. The sizes of the insulating plate 3, cathode 1 and anode 2 must be determined at least not so as to generate the arc discharge at the place other than desired place. The substrate (base plate) 7 is made of a heat resistant material resisting 1000° C. and above such as stainless steel, ceramics, etc. The size of the substrate 7 is larger than 20 mm×20 mm. The distance between the substrate 7 and arc jet is between about 5 mm and 200 mm. When such distance is too short, the substrate 7 melts. On the contrary when such distance is too long, the amount of deposition of soot is small. The substrate 7 is placed opposite to the direction of generation of the arc jet 5. The substrate 7 is adapted to contact directly with the arc jet 5. This is because the arc jet is cooled sharply by the substrate, thereby forming a large amount of soot. However, the substrate 7 may be placed in a given space toward the arc jet.

The insulating substrate 7 as a recovering member is made of a heat resistant material resisting high temperatures (about 1000° C. and above). Such a heat resistant material includes a semiconductor. Since the arc plasma is higher in conductivity, a material having resistance of 1 Ω/mm and above can be safely used. The resistance of arc is about 0.2 Ω/mm. For example, polytetrafluoroethylene, mica, ceramics or silicon can be safely used. In particular, polytetrafluoroethylene is most preferable. This is because polytetrafluoroethylene is also evaporated by heat to generate gas which contributes to form the arc jet 5. Ceramics melts by the heat of arc and adheres to the surface of the electrode as a glass-like substance.

When pure graphite is used as an electrode and when the recovering plate contains a magnetic component, such as stainless steel, a carbon nanoparticle having magnetic properties can be synthesized, because the magnetic component melts and penetrates into the covering plate. When using Ni-and Y-doped graphite as an electrode, it is possible to impart magnetic properties to the soot of the whole carbon nanoparticle, because the soot is contaminated with Ni and Y.

In example 1, the cathode 1, anode 2 and insulating plate 3 take the shape of rectangle, respectively. However, the cathode 1, anode 2 and insulating plate can take various types of shapes such as circular, triangle, etc. By making the substrate 7 for a recovering member so as to be self-supporting, the substrate 7 can be used as base stage 8 as a holding member. Accordingly, the base stage 8 can be omitted.

In FIG. 1(a), the shape of arc jet 5 (position of deposited soot 9) is not uniform in an upper direction and lower direction in the vicinity of the substrate 7. That is to say, the arc of the arc jet 5 in an upper direction on the substrate 7, or sheet, is long, but in a lower direction on the sheet is short. This is because the arc formed by the arc jet 5 generates a bump by its own heat.

The carbon nanoparticle (soot) deposited onto the substrate 7 is separated from the substrate 7 and recovered. The carbon nanoparticle (soot) thus recovered unchanged can be used for a primary battery, secondary battery, fuel battery, electron emission source, gas storing device, gas-liquid cleaning apparatus, gas-liquid modifying apparatus, additive for rubber, resin(plastics), urethane, elastomer, etc., lubricant, abrasive, cutting agent etc. Further, the soot thus recovered can be purified and used as a carbon nanomaterial for a single carbon nanohorn etc.

Figure 2:
FIG. 2 is a photograph showing the state of a second electrode used in the apparatus shown in FIG. 1 prior to an arc discharge.
Figure 2:
Figure 3:
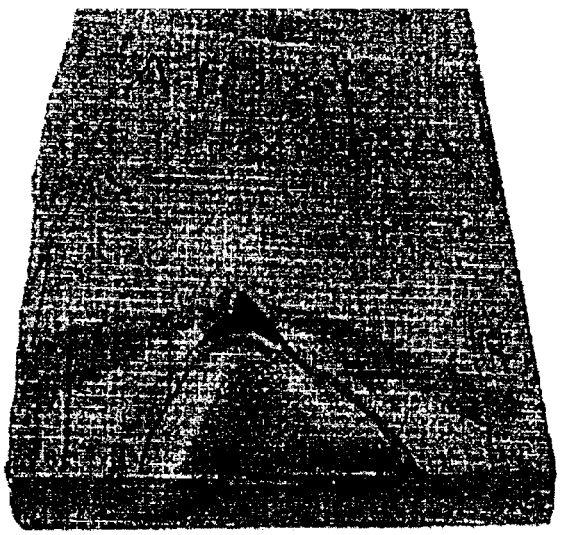
FIG. 3 is a photograph showing the state of a whistle arc jet formed on the surface of the second electrode used in the apparatus shown in FIG. 1.
Figure 4:
FIG. 4 is a photograph showing the state of surface of the second electrode used in the apparatus shown in FIG. 1 on which a whistle arc jet is not formed.

FIGS. 2–4 are photographs showing the state of the surface of the anode when production experiments were carried out in which the shape of the notch 4 of the insulating plate 3 as an insulating member is triangle, and the depth and width of the notch 4 are 15 mm and 10 mm, respectively. The insulating plate 3 is made of poritetrafluoroethylene and a thickness of 1 mm. The cathode 1 as a first electrode and anode 2 as a second electrode are made of pure graphite. Time for the arc discharge is one second. When the anode 2 is not relatively moved, the limit of discharge time is two seconds.

FIG. 2 is a photograph showing the state of the surface of the anode before arc discharge. FIG. 3 is a photograph showing the state of the surface of the anode when the arc electric current is 200 A and a whistle arc jet 5 is formed. FIG. 4 is a photograph showing the state of the surface of the anode when arc electric current is 50 A and a whistle arc jet 5 is not formed. Comparing the state where the whistle arc jet 5 is formed as shown in FIG. 3 with the state before the arc discharge. Shown in FIG. 2, it is understood that the surface of the anode 2 corresponding to the notch 4 of the insulating plate 3 is approximately uniformly evaporated. On the other hand, observing the state where the whistle arc jet is not formed shown in FIG. 4, that is the case where whistle sound is not generated, but discontinuous sounds such as "clap-clap-clap" are generated, it is observed that the surface of the anode 2 is not evaporated uniformly, but a plurality of anode point craters about 2 mm diameter is continuously or discontinuously formed. In such a state, carbon nano-fine particle containing carbon nanohorn is hardly produced.

Figure 5:
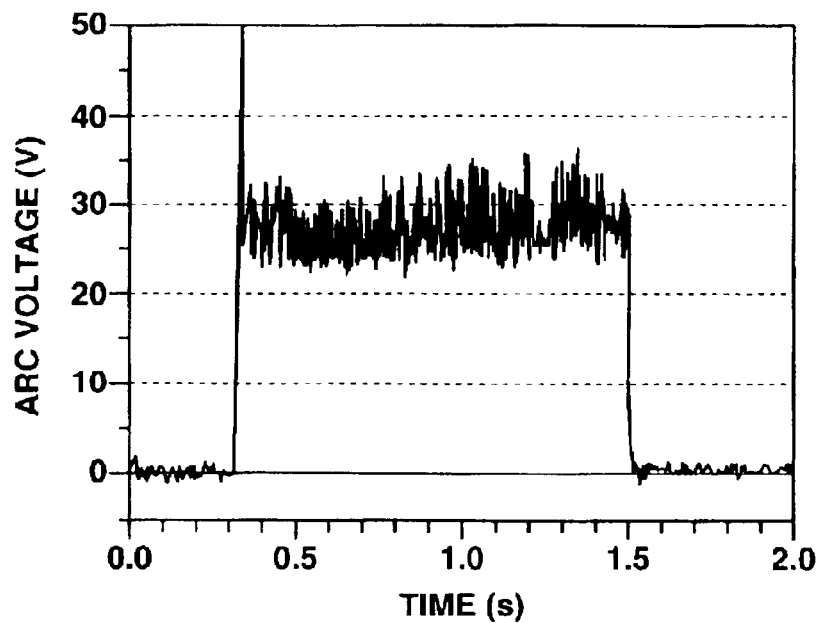
FIG. 5 is a chart showing a wave shape of arc voltage in the case of FIG. 3 in which a whistle arc jet is formed.
Figure 6:
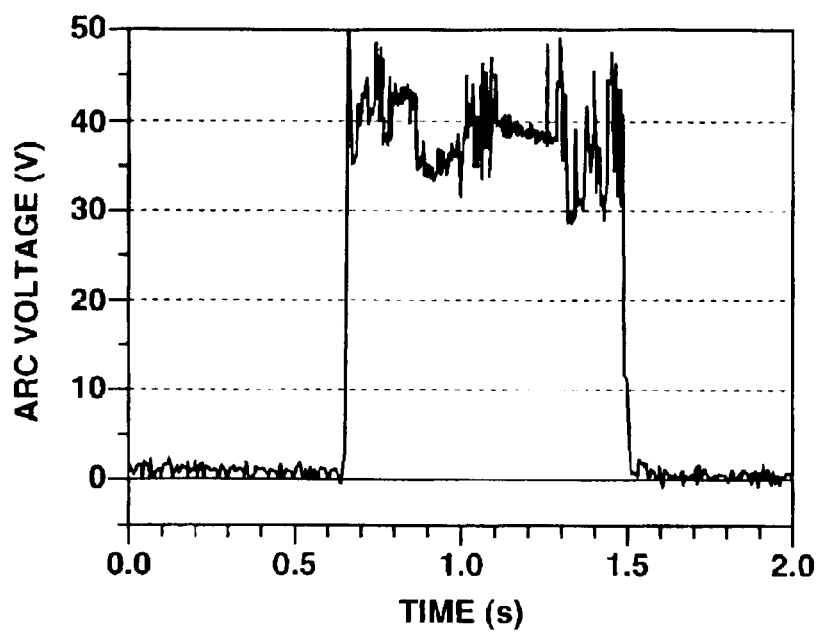
FIG. 6 is a chart showing a wave shape of arc voltage in the case of FIG. 4 in which a whistle arc jet is formed.

FIGS. 5 and 6 show the wave shape of arc voltage. FIG. 5 shows a wave shape of arc voltage when whistle arc jet 5 is formed, that is, the case shown in FIG. 3. FIG. 6 shows a wave shape of arc voltage when whistle arc jet 5 is not formed, that is, the case shown in FIG. 4. As shown in FIG. 6, the arc voltage when the arc jet 5 is not formed is about 40V. As shown in FIG. 5, the arc voltage when the arc jet 5 is formed is decreased to about 27V.

This is because when the arc jet 5 is formed, the anode point becomes enlarged and the resistance on the surface of the anode decreases, and hence, the anode fall voltage decreases. As a result, the same quantity of electric current flows into the anode, anode point and arc positive column. Since the cross sectional area of the anode point is smaller than those of the anode and positive column plasma, an electric current hardly flows, that is, an electric current flows in a shape of bottle neck. Accordingly, the resistance becomes high. It is considered that when the anode point becomes enlarged, an electric current easily flows, that is, bottle neck disappears, and hence, the resistance decreases.

FIGS. 7–11 are photographs of transmission electron microscope of soot 9 recovered by the substrate 7 as a recovering member when whistle arc jet 5 is formed by the use of pure graphite electrode for both the cathode 1 and anode 2. A pure graphite typically means graphite free from impurities. Strictly speaking, a pure graphite does not contain impurities at all. However, the term "pure graphite" used herein can include graphite in which a catalyst is intentionally. Moreover, when graphite or resin which contains activated carbon or amorphous carbon or catalyst metal is used instead of a pure graphite electrode, similar results can be obtained.

The term "resin" used herein is a conductive resin having functions as an electrode, for example, resin which is mixed with graphite or metal to impart conductivity. In this case, resin, per se, or carbon component such as graphite mixed with resin is a raw material for nanocarbon material including nanohorn.

Figure 7:
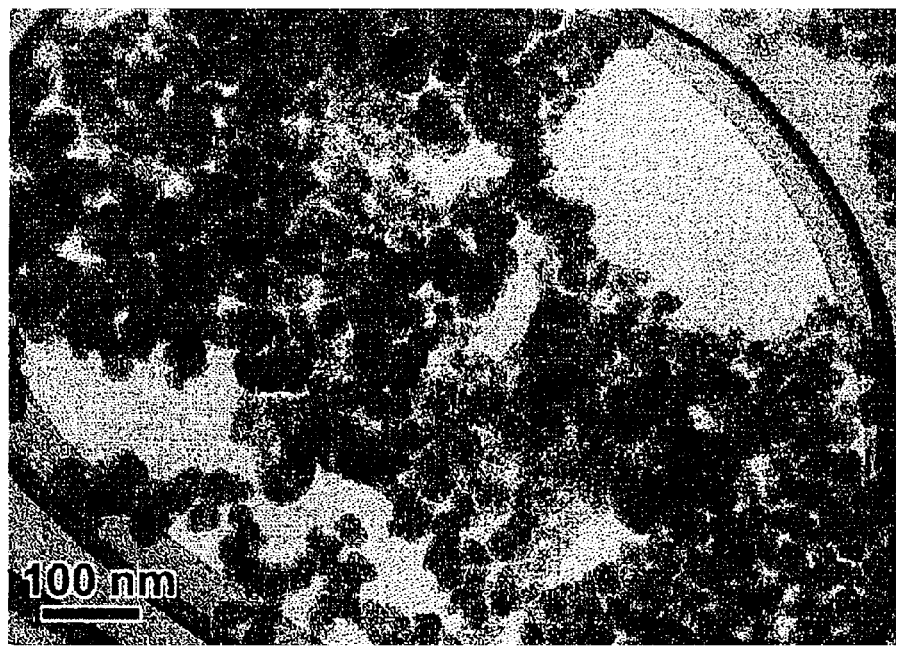
FIG. 7 is a photograph of transmission electron microscope (TEM) at low magnification of the entire image of soot, that is, carbon nanomaterial containing carbon nanohorn prepared by the use of the apparatus shown in FIG. 1.

FIG. 7 is a photograph of transmission electron microscope at low magnification of soot 9. It is evident from FIG. 7 that almost all the soot 9 is fine particles having a diameter of about 100 nm and below.

Figure 8:
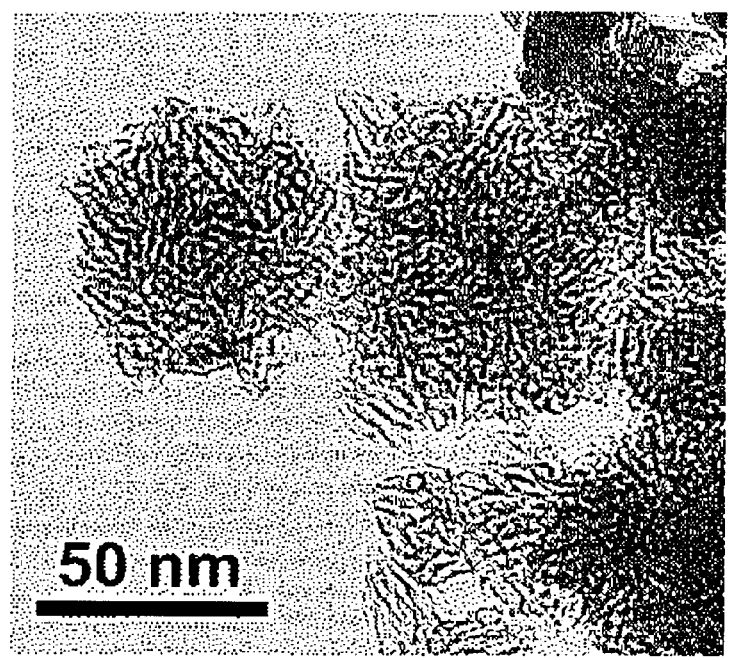
FIG. 8 is a photograph of transmission electron microscope (TEM) at high magnification of carbon nano-fine particles contained in the soot prepared by the use of the apparatus shown in FIG. 1.

FIG. 8 is a photograph of transmission electron microscope at high magnification of fine particles of aggregation of carbon nanohorn. It is evident from FIG. 8 that a horn-shaped carbon nanohorn exists in outer periphery of the fine particle. Such a particle accounts for about 30% of the entire particles. Almost all the carbon nanohorn was monolayer, but two-layered carbon nanohorn was rarely observed.

Figure 9:
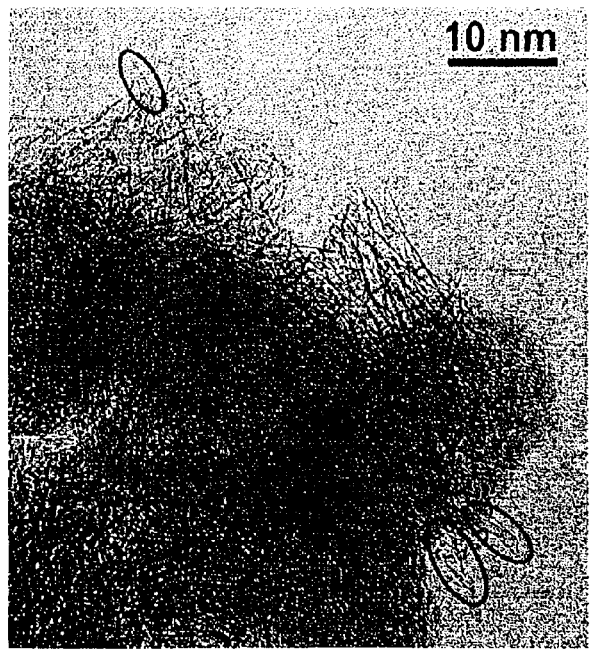
FIG. 9 is a photograph of transmission electron microscope (TEM) at high magnification of extremely short mono-layer carbon nanotube contained in the soot prepared by the use of the apparatus shown in FIG. 1.

There exists a fine particle partially containing extremely short carbon nanotube, not carbon nanohorn. Such a monolayer carbon nanotube is shown in FIG. 9. In the frame of FIG. 9 exists an extremely short monolayer carbon nanotube. The length of the tube is about 10 mm and below. An example which produces a monolayer carbon nanotube without the use of catalyst has been conventionally formed. It is considered that a long monolayer nanotube is not formed without the use of catalyst. Since, however, the size of the short monolayer nanotube is the same as that of nanocapsule, it is considered that a small graphite sheet curls into a tube shape to form an extremely short monolayer carbon nanotube.

Figure 10:
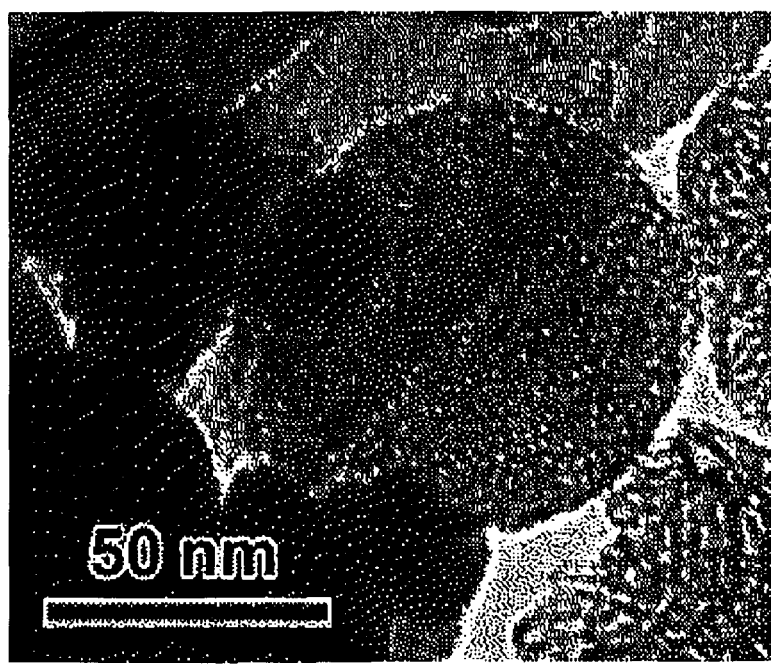
FIG. 10 is a photograph of transmission electron microscope (TEM) at high magnification of a precursor (foam-like particle) of carbon nano-fine particle contained in the soot prepared by the use of the apparatus shown in FIG. 1.

Further, almost all of the other fine particles have a structure shown in FIG. 10. Such particles are precursors which do not sufficiently grow up to be a carbon nanohorn or extremely short monolayer nanotube fine particle. The term "precursor" used herein means an aggregates of only heads of carbon nanohorn or carbon nanotube without bodies thereof. The precursor looks visually like a foam-shaped aggregates. Such facts are introduced in: [Pore structure of single-wall carbon nanohorn aggregates/K. Mrata, K. Kaneko, F. Kokai, K. Takahashi, M. Yudasaka, S. Iijima, Phys. Lett. Vol. 331, pp. 14–20(2000)].

When using a pure graphite electrode, a minute amount of fullerene, multilayer carbon nanohorn and nanopolyhedron other than the afore-mentioned carbon nanohorn or carbon nanotube are contained in the carbon nanoparticle produced by the method of the present invention. Herein, the fullerene is a giant spherical shell-shaped substance illustrated by chemical formula $C_n$ in which C is a carbon atom, n is an even number of from 32 to 100 and above. The nanopolyhedron is a polyhedron carbon nano-fine particle ["Basis of Carbon Nanotube" /Y. Saito, S. Bando. pp. 37–42, Corona Publishing Co. Ltd. (1998)].

Figure 11:
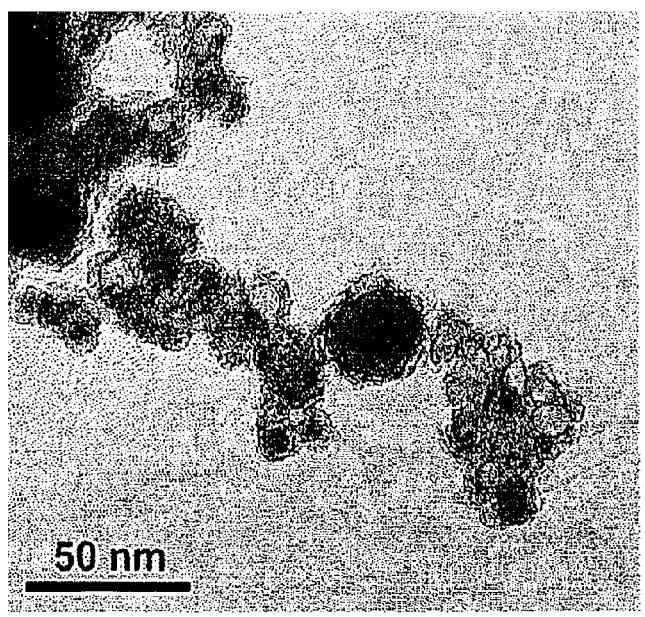
FIG. 11 is a photograph of transmission electron microscope (TEM) at high magnification of a balloon-like nanoparticle contained in the soot prepared by the use of graphite electrode of mixture of Ni with Y in the apparatus shown in FIG. 1.

When using Ni-and Y-doped graphite electrode, a minute amount of fullerene, bundle-shaped or single monolayer carbon nanotube, multilayer carbon nanotube and nanopolyhedron are contained in the carbon nanoparticle produced by the method of the present invention. Herein, the term "bundle-shaped" means, for example, a shape such as a bundle of straw. Further, there exists approximately 5%–10% of balloon-like nano-fine particle as shown in FIG. 11. Herein, the term "balloon-like nano-fine particle" means a nanocarbon larger than a nanocapsule which has few layers in the case of monolayer and comprises two to ten layers.

Figure 12A:
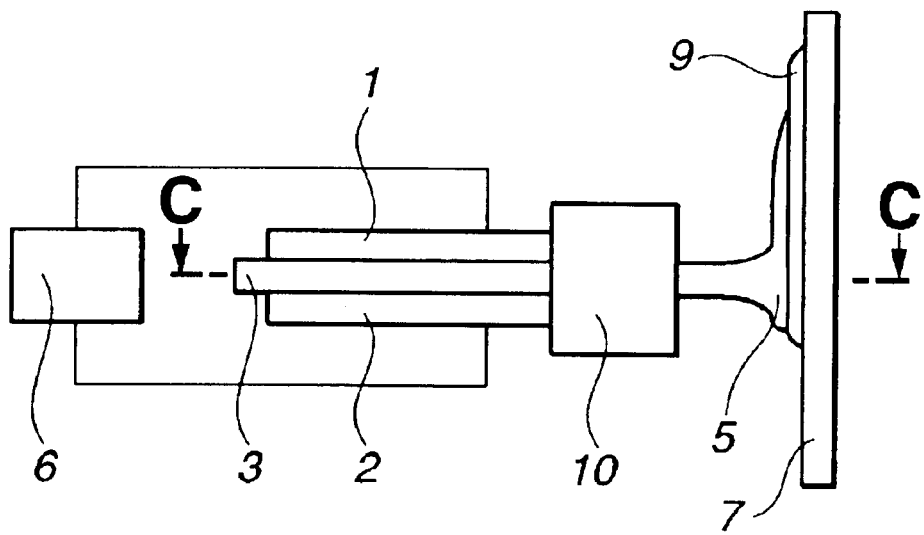
FIG. 12(a) is a schematic illustration of a second example of an apparatus used for preparing a carbon nano-fine particle in which is used a magnetic field.
Figure 12B:
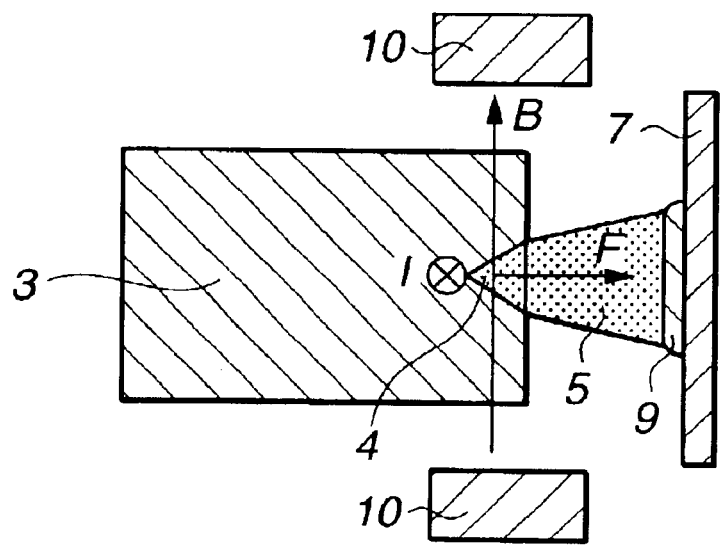
FIG. 12(b) is cross section of FIG. 2(a)

Next, example 2 is described with reference to FIG. 12. Example 2 shows an apparatus for generating an arc jet. FIG. 12(a) is a schematic illustration of an apparatus used in example 2 for preparing a carbon nano-fine particle. FIG. 12(b) is cross section taken along plane C—C of FIG. 2(a). In FIG. 12, the same parts as those of FIG. 1 are given same reference numerals, and descriptions thereon are omitted.

As shown in FIG. 12, the production apparatus of this example comprises a set of magnetic coils as a magnetic field applying member (magnetic field generating member) in addition to the structures of the production apparatus of example 1. A permanent magnet may be used for the magnetic coil 10. The magnetic coil 10 is positioned so as to cross the shortest straight line connecting the cathode 1 with the anode 2. Of course, the magnetic coil 10 may be positioned so as to cross the shortest straight line at right angles.

By using such an apparatus structure, a magnetic field is applied in a direction perpendicular to the flow of current. Since plasma generated by an arc discharge is a high temperature ionized gas fluid, it is curved by an external force in the direction of the force. In this example, it accepts the force F in the direction of spout hole by the interaction of electric current I of the arc with magnetic field applied This phenomenon obeys a Fleming's left-hand rule: 1) For a current-carrying wire: If the fingers of the left hand are placed around the wire so that the thumb points in the direction of electron low, the fingers will be pointing in the direction of the magnetic field produced by the wire; 2) For a movable current-carrying wire or an electron beam in a magnetic field: If the thumb, first, and second fingers of the left hand are extended at right angles to one another, with the first finger representing the direction of magnetic lines of force and the second finger representing the direction of electron flow, the thumb will be pointing in the direction of motion of the wire or beam. As a result, arc plasma is jetted from the orifice of the notch 4 to form arc jet 5. Carbonaceous components contained in the arc jet 5 form carbon nanomaterials such as carbon nanohorn etc. in the cooling process.

The stronger the magnetic field, the better in principle. However, when excessively strong magnetic field is applied, the arc voltage increases. As a result, the possible output voltage of the electric source can be exceeded. This is because an arc positive column plasma for the passage of arc current curves and the distance between electrodes becomes long relatively; the resistance of the arc positive column plasma increases, and hence, the arc voltage increases. When using a general-purpose arc electric source 6, the magnetic flux density is properly in the range of between 1 mT and 500 mT.

Figure 13A:
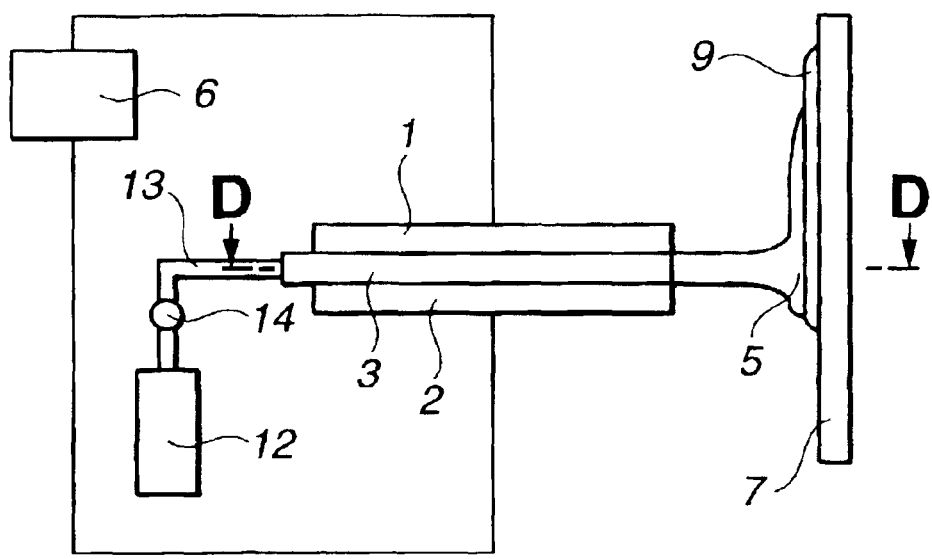
FIG. 13(a) is a schematic illustration of a third example of an apparatus used for preparing a carbon nano-fine particle in which a gas is used.
Figure 13B:
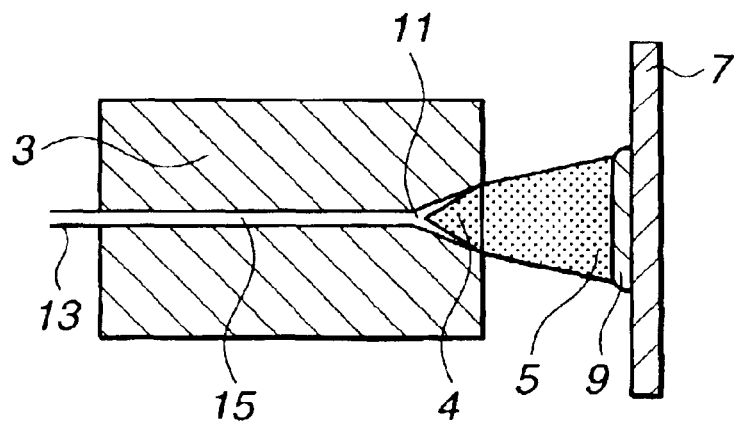
FIG. 13(b) is cross section of FIG. 13(a)

Example 3 is described with reference to FIG. 13. Example 3 shows an example of apparatus for generating an arc jet. FIG. 13(a) is a schematic illustration of an apparatus used in example 3 for preparing a carbon nano-fine particle. FIG. 13(b) is cross section taken along plane D—D of FIG. 13(a). In FIG. 13, the same parts as those of FIG. 1 are given same reference numerals, and descriptions thereon are omitted.

As shown in FIG. 13, the production apparatus of this example comprises, in addition to the structure of the production apparatus of example 1, the gas cylinder 12 as a gas-supplying source for supplying the specific gas 11 to the arc jet (arc)5, the gas-introducing tube 13 for introducing the specific gas 11 from the gas cylinder 12 to the gas-flowing part 5 of the insulating plate 3, a gas-controlling apparatus placed between the gas cylinder 12 and the insulating plate 3 for adjusting the flow of the specific gas 11 from the gas cylinder 12 and the flow meter 14. A specific gas supplying member is composed of the gas cylinder 12, gas-introducing tube 13, gas-controlling apparatus and the flowmeter 14.

As shown in FIG. 13, the production apparatus of example 3 is different from the production apparatus of example 1 in the shape of the insulating plate 3. The insulating plate 3 of example 3 is provided with the gas-flowing part 15 for the specific gas 11 as well as the notch 4. The gas-flowing part 15 is adapted to be connected with the notch 4. The gas-flowing part 15 is a line-shaped hole formed by boring the insulating plate 3. In other word, the gas-flowing part 15 is formed as a tubular bore inside the insulating plate 3. The gas-flowing part 15 may be formed in the insulating plate 3 so that the cathode 1 and the anode 2 placed opposite each other do not generate arc discharge. For example, a groove is formed so as to expose either the cathode 1 or anode 2, which is connected to the notch 4.

In the production apparatus of example 3, the specific gas 11 is forcefully sent preferably to the deepest recess of the notch 4 of the insulating plate 3 from a gas inlet (a part of the gas-flowing part 15) opposite to the spout hole of the arc jet 5. The specific gas 11 thus sent pushes the arc toward the spout hole and serves to form the arc jet 5, and simultaneously, serves to prevent the insulating plate 3 from coming into contact with arc to protect the insulating plate 3.

When the specific gas is sprayed to the arc electrode point of the arc jet 5, the specific gas flows not only to the arc electrode point (boundary between plasma arc positive column and the solid electrode), but also to the positive column. However, the amount of penetration of the specific gas into the arc electrode point is smaller than into the positive column, as if breath is blown against flames of lighter or candle from the side. The introduction of the specific gas 11 is an effective means in such a manner as described above. It is considered that the amount of combustion of soot deceases by supplying an inert gas such as rare gas etc. Further, the electrode are cooled by the specific gas 11, the electrodes can be prevented from being damaged by heat.

The specific gas 11 utilizable as an inert gas such as Ar, He, etc. $O_2$ gas, $N_2$ gas and $H_2$ gas, carbon-containing gas such as hydrogen carbon gas, carbon dioxide gas, etc. air, atmosphere or mixture thereof. In particular, Ar, He, $N_2$ and air are preferable. Ar is most preferable, above all. However, when gas other than At is used, it is possible to change a product. The air does not contain moisture at all. The atmosphere is air containing moisture, that is, the relative humidity of the air is above 0% and less than 100%. Most simple is atmospheric air having atmospheric pressure, which can be supplied by a compressor. When it is not necessary to keep the flow of the specific gas 11 constant, the gas-controlling apparatus and gas flowmeter 14 are not necessary.

According to such a production process as described above, when air, nitrogen or nitrogen-containing gas is used as the specific gas 11, N-containing nanomateral, that is, CN-nanotube etc. can be formed. When graphite containing B-containing material, or graphite containing B-containing metal catalyst or additives, or graphite which is sprayed or applied or plated or coated with B-containing material or additives is used as the anode 2 and air or nitrogen is used, carbon nanomaterial containing BCN-network structure, that is, BCN-nanotube etc. can be formed. Similarly, a various kinds of nanocarbon materials can be formed by changing atmospheric gas or additives. Herein, B is boron, C is carbon, and N is nitrogen.

Figure 14A:
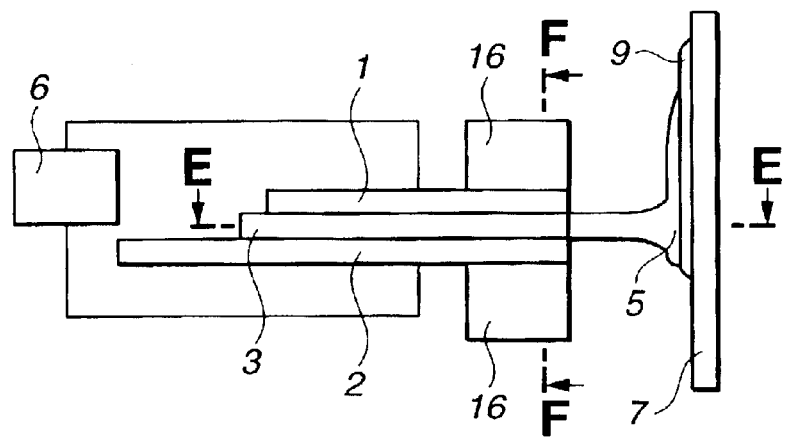
FIG. 14(a) is a schematic illustration of a fourth example of an apparatus used for preparing a carbon nano-fine particle in which a continuous production method is used, that is, a method of sliding an evaporating electrode parallel to an insulating plate.
Figure 14B:
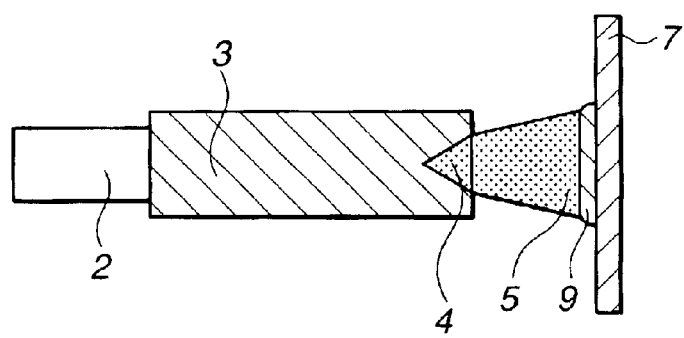
FIGS. 14(b) and (c) are cross sections of FIG. 14(a)
Figure 14C:
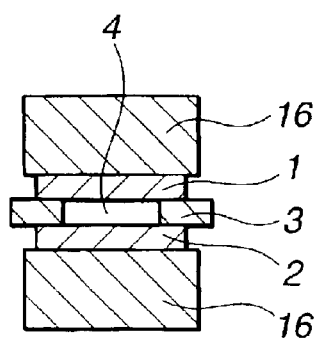

Example 4 is described with reference to FIG. 14. Example 4 shows an example of an apparatus for preparing continuously carbon nano-fine particle containing carbon nanomaterial such as carbon nanohorn, etc. FIG. 14(a) is a schematic illustration of an apparatus used in example 4 for preparing a carbon nano-fine particle. FIG. 14(b) is cross section taken along plane E—E of FIG. 14(a). FIG. 14(c) is cross section taken along plane E—E of FIG. 14(a). In FIG. 14, the same parts as those of FIG. 1 are given same reference numerals, and descriptions thereon are omitted.

As shown in FIG. 14, the production apparatus of example 4 is nearly the same as that of FIG. 1. A different point is that the width of the evaporating electrode 2 in FIG. 14 is less than the width of the evaporating electrode 2 in FIG. 1, such that the evaporating electrode 2 in FIG. 14 is slightly larger than the width of the notch 4, and the evaporating electrode 2 is made longer. For example, it is sufficient that the width of the evaporating electrode 2 in FIG. 14 is several tens mm. Thereby, the effective use of material is possible. The apparatus of example 4 has a structure that when the evaporating electrode 2 positioned at the notch 4 of the insulating plate 3 is evaporated, the raw material is supplied by gradually feeding the evaporating electrode 2 toward the notch 4. By feeding the evaporating electrode 2 gradually, continuous production is feasible.

When the insulating material of the insulating plate 3 is consumed, it is better to send the insulating plate 3 simultaneously with the anode 2. For example, sending the insulating plate 3 can be carried according to the following method: the insulating plate 3 is divided into three equal parts, that is, upper part, middle part and lower part, and the delivery rate of the middle part of the insulating plate 3 is controlled to secure the notch 4 of the insulating plate 3.

The evaporating electrode 2 is supplied continuously while carrying out arc discharge continuously. It is, however, possible to supply the evaporating electrode 2 discontinuously while carrying out arc discharge discontinuously. In the time of continuous production, a method can be adopted in which after the evaporation rate of an electrode is determined for a certain current, the delivery rate of the evaporating electrode 2 is determined.

Relative movement between the cathode 1 and anode 2 can be carried out manually (by human hand), or automatically by the use of an apparatus provided with a moving means for moving the anode 2 at least in the desired direction, for example, NC (numerical control) apparatus. Alternatively, both the cathode 1 and the anode 2 are allowed to be moved.

Further, one different point between the production apparatus of example 4 and that of FIG. 1 is that the former is provided with a water-cooling block 16 as a cooling member for cooling both the cathode 1 and anode 2. The water-cooling block 16 cools each of the cathode 1 and anode 2 so that production operation is feasible for a long time. It is preferable to keep the temperatures of the cathode 1 and anode 2 at about 200° C. and below. Otherwise, the temperatures of the cathode 1 and anode 2 rise to about between 200° C. and 600° C. By keeping the temperatures of the cathode 1 and anode 2 at about 200° C. and below, continuous production is feasible.

The water-cooling block 16 comprises a block part in contact with the cathode 1 and anode 2, and a pipe which has a bore for flowing cooling medium such as water, oil, etc for cooling the block part, and penetrates the block part, and is in contact with the block. The cooling member is not limited to the water-cooling block 16, but any structure that can cool the cathode 1 and anode 2, such as by blowing or spraying a cooling medium, such as water, carbon dioxide gas, and the like, can be used without departing from the scope of the invention.

The material of the water-cooling block 16 is not specifically limited. However, the material of the water-cooling block 16 for the anode 2 is preferably graphite. This is because when the evaporating electrode 2 has been evaporated, arc for forming the arc jet 5 comes into contact directly with the water-cooling block 16, and hence, the water-cooling block 16 melts to cause leakage of water. If the water-cooling block 16 for the anode 2 is made of graphite, there is no serious problem even if the arc comes into contact with the graphite.

Figure 15A:
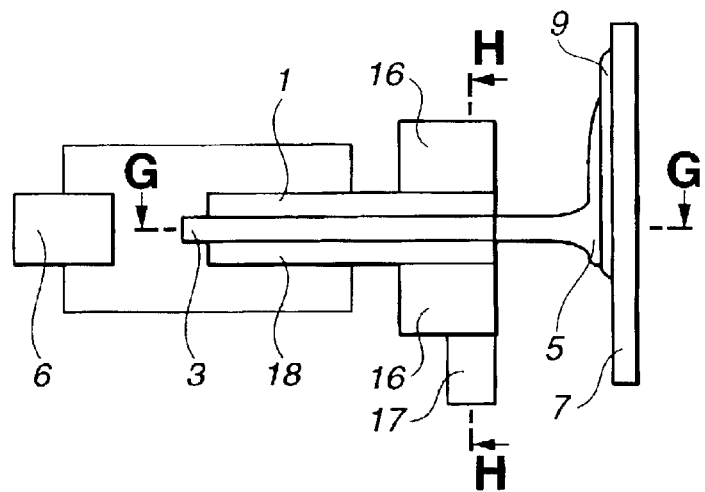
FIG. 15(a) is a schematic illustration of a fifth example of an apparatus used for preparing a carbon nano-fine particle in which a continuous production method is used, that is, method of pushing an evaporating electrode perpendicular to an insulating plate.
Figure 15B:
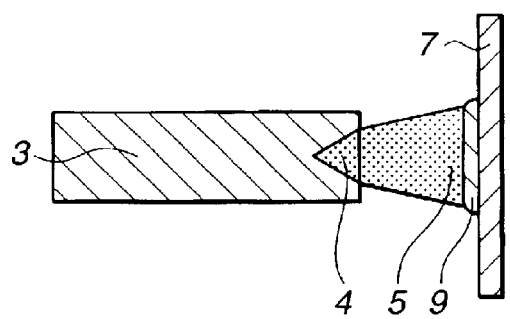
FIGS. 15(b) and (c) are cross sections of FIG. 15(a)
Figure 15C:
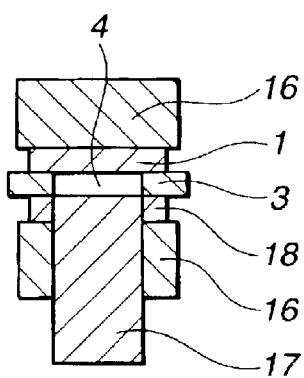

Example 5 is described with reference to FIG. 15. Example 5 shows an example of an apparatus for preparing continuously carbon nano-fine particle containing carbon nanomaterial such as carbon nanohorn, etc. FIG. 15($a$) is a schematic illustration of an apparatus used in example 5 for preparing a carbon nano-fine particle. FIG. 15($b$) is cross section taken along plane G—G of FIG. 15($a$). FIG. 15($c$) is a cross section taken along plane H—H of FIG. 15($a$). In FIG. 15, the same parts as those of FIG. 14 are given same reference numerals, and descriptions thereon are omitted.

The production apparatus shown in FIG. 14 adopts a method for supplying raw materials in which the raw materials are continuously supplied by sliding the evaporating electrode 2 horizontally with the insulating plate 3. By contrast, in the production apparatus shown in FIG. 15, the evaporating electrode 2 as a raw material (anode graphite material) is sent by relative movement from the direction intersecting the insulating plate 3, that is, from the direction perpendicular to the insulating plate 3 and the raw material is continuously evaporated. In the production apparatus shown in FIG. 15, the anode 2 shown in FIG. 14 is divided into two parts, one is the movable evaporating electrode 17 and the other is the anode current introducing terminal 18 fixed for applying voltage to the evaporating electrode 17. Originally, the anode 2 has both a function of the evaporating electrode 17 and a function of the anode current introducing terminal 18 fixed for applying voltage to the evaporating electrode 17.

Comparing the production apparatus shown in FIG. 14 with that shown in FIG. 15, the insulating plate must be sent because it is usually impossible that the insulating plate 3 is not consumed at all. Accordingly, the structure of apparatus shown in FIG. 14 is more preferable in which the graphite electrode 2 as a raw material and the insulating plate 3 can be sent at the same time. However, when an insulating plate material which is hardly consumed is used or gas-cooling is adopted, an apparatus shown in FIG. 15 is more preferable. This is because the apparatus shown in FIG. 15 can make use of all the raw materials. On the contrary, since the system of the apparatus shown in FIG. 14 can not evaporate all the raw materials, residues of raw materials are produced.

Figure 16:
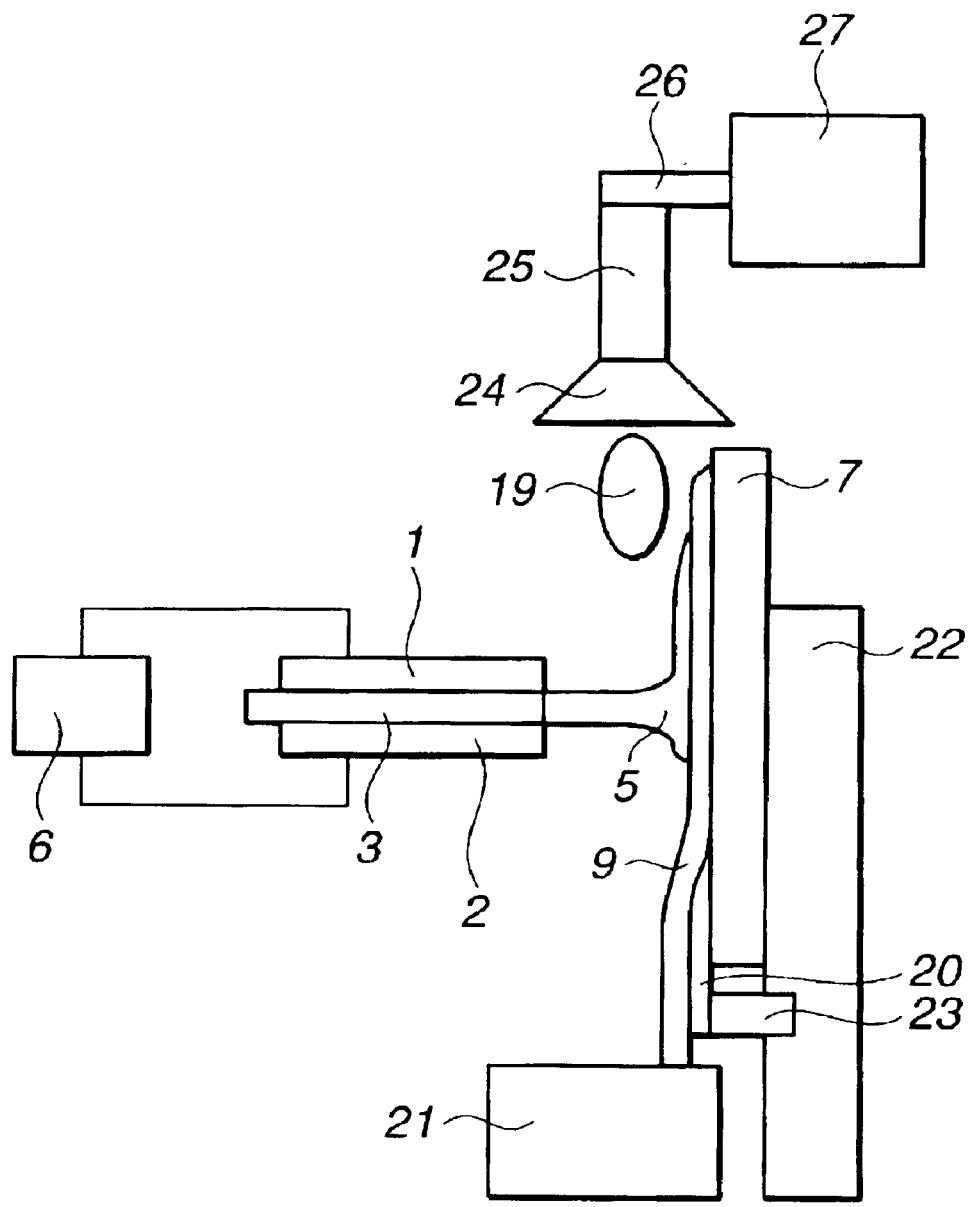
FIG. 16 is a schematic illustration of a sixth example of an apparatus used for preparing a carbon nano-fine particle in which an effective recovering method is used.

Example 6 is described below with reference to FIG. 16. Example 6 shows an example of apparatus for recovering effectively raw materials when a carbon nanoparticle containing carbon nanomaterial such as carbon nanohorn etc. is produced continuously by the use of the production apparatus shown in FIG. 14 or FIG. 15. FIG. 16 is a schematic illustration of an apparatus used in example 6 for preparing a carbon nano-fine particle. In FIG. 16, the same parts as those of FIG. 1 (FIG. 14 or FIG. 15) are given same reference numerals, and descriptions thereon are omitted.

In the production apparatus shown in FIG. 1, there is a disadvantage that when generating an arc continuously, carbon nano-fine particles (soot) 9 deposited on the substrate 7 disappears by the heat of the arc or are oxidized. Then, in order to solve such a disadvantage, a method is adopted comprising steps of rotating the substrate 7, depositing the soot 9 to one place of the rotating substrate 7, removing the deposit (soot 9) from the substrate 7 by using the scraper 20 at the place where is not irradiated with arc, and storing the soot thus removed in the storing apparatus 21.

In FIG. 16, reference number 22 denotes a rotating-moving apparatus for rotating the substrate 7. Reference number 23 denotes a fixing member for fixing the scraper 20 to the rotating-moving apparatus. The scraper 20 is closely in contact with the substrate 7 by a tension-imparting member such as a spring etc. constituting the fixing member 23. The deposit (soot 9) can be removed by moving the base plate to-and-fro under the use of the scraper 20.

Soot 19 which does not deposit to the substrate 7 is also generated and floats in the air. It is considered that about 30% of the whole soot do not deposit to the base plate. By collecting such soot 19, the recovering rate is increased. Therefore, a recovering system (recovering member) comprising a vacuum hole 24, a soot collecting filter 25, a connecting tube 26, and a vacuum apparatus 27 is placed above the substrate 7, by which is recovered soot 19 floating in the air.

The vacuum hole 24 takes the wide-mounted shape in order to collect soot 19 floating in wide range. The filter 25 can be any appropriate filter, such as a commercially available general-purpose paper filter. Likewise, the vacuum apparatus 27 can be any commercially available general-purpose vacuum cleaner, suction pump, vacuum pump, and the like. Since a bump is generated by the heat of the arc forming the arc jet 5, the vacuum hole 24 for recovering floating soot 19 is preferably positioned above the arc.

Figure 17:
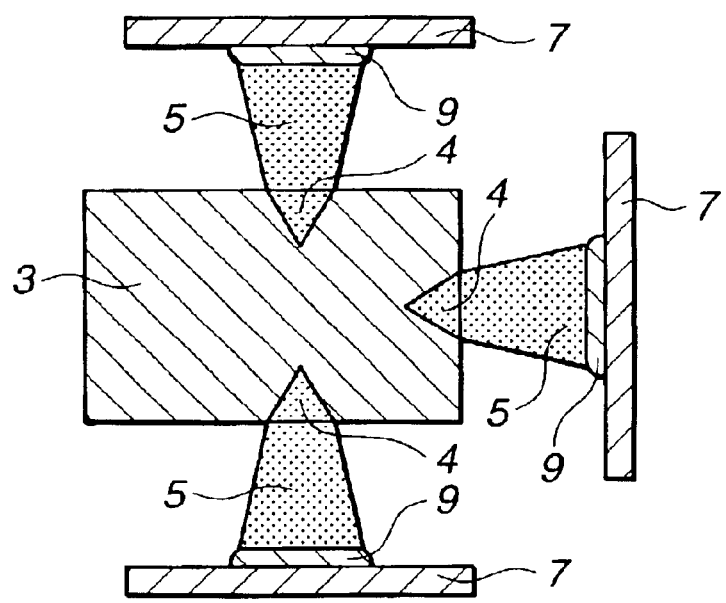
FIG. 17 is a schematic illustration of a seventh example of an apparatus used for preparing a carbon nano-fine particle in which a plurality of arc jets is used.

Example 7 is described below with reference to FIG. 17. Example 7 shows an example of an apparatus for preparing more effectively carbon nano-fine particles containing carbon nanomaterial by the use of a plurality of arc jets. FIG. 17 is a schematic illustration of an apparatus of example 7 used for preparing a carbon nano-fine particle. FIG. 17 corresponds to FIG. 1($b$) of example 1 shown in FIG. 1. The rest of the structures are the same as those shown in FIG. 1. In FIG. 17, the same parts as those of FIG. 1 are given the same reference numerals.

As shown in FIG. 17, the structure of the production apparatus of example 7 is almost the same as that of example 1 shown in FIG. 1. Different points between them are that a plurality of the notches 4 of the insulating plate 3 as an insulating member is provided in example 7, that is, three, and that the substrate 7, as a recovering member, is placed to each of the plural notches 4 (arc jet 5). By such a structure of apparatus, a plurality of arc jets 5 can be generated at the same time, thereby making it possible to deposit soot 9 at plural places, that is, in the plural directions. That is to say, by forming not only one notch 4, but plural notches 4, it is possible to increase the yield of carbon nano-fine particles.

Figure 18A:
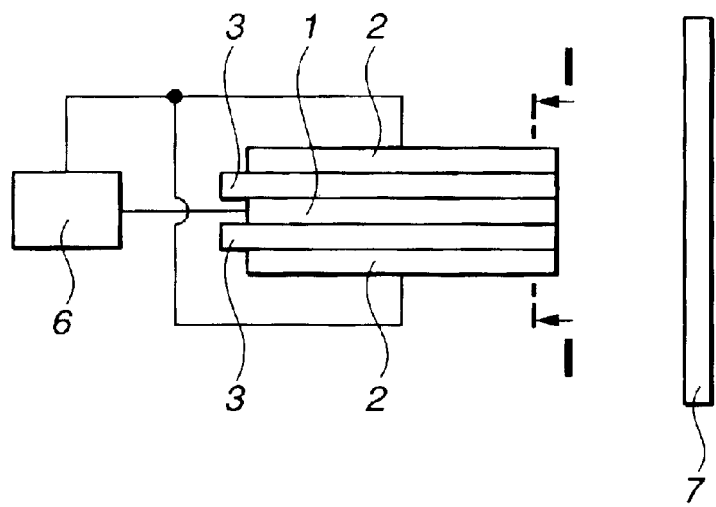
FIG. 18 is a schematic illustration of an eighth example of an apparatus used for preparing a carbon nano-fine particle in which another method using a plurality of arc jets is used.

Example 8 is described below with reference to FIG. 18. Example 8 shows another example of apparatus for preparing carbon nano-fine particles containing carbon nanomaterial by the use of a plurality of arc jets. FIG. 18($a$) is a schematic illustration of an apparatus used in example 8 for preparing a carbon nano-fine particle. FIG. 18($b$) is cross section taken along plane I—I of FIG. 18($a$). FIG. 18($c$) is a cross section showing a variation of FIG. 18($b$). In FIG. 18, the same parts as those of FIG. 1 are given same reference numerals, and descriptions thereon are omitted.

As shown in FIG. 18($a$) and FIG. 18($b$), the structure of the production apparatus of example 8 is almost the same as that of example 1 shown in FIG. 1. A different point between them is that each of the anode 2 and insulating plate 3 is placed opposite to both surfaces of the cathode 1 like a sandwich structure. By such a structure of apparatus, a plurality of arc jets 5 (two arc jets in example 8) can be generated at the same time, thereby making it possible to deposit soot 9 at almost the same place, that is, in the same direction. That is to say, by laminating a plurality of the evaporating electrodes 2 as a second electrode, it is possible to increase the yield of carbon nano-fine particles.

Figure 18B:
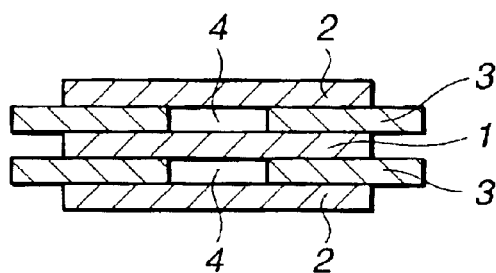
Figure 18C:
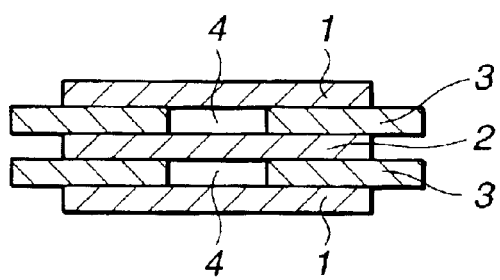

FIG. 18(c) is an example of variation of another apparatus for increasing the yield of carbon nano-fine particle by the use of a plurality of arc jets. A different point between FIG. 18(c) and FIG. 18(b) is that each of the cathode 1 and the insulating plate 3 is placed on both surfaces of the anode 2 respectively in FIG. 18(c) like a sandwich structure. By such a structure of apparatus, a plurality of arc jets 5 (two arc jets in example 8) can be generated at the same time, thereby making it possible to deposit soot 9 at almost the same place, that is, in the same direction. That is to say, by laminating a plurality of the cathodes 1 on the anode 2, it is possible to increase the yield of carbon nano-fine particles.

In each example, examples are shown in which a base plate is used as a recovering member. However, instead of the base plate, fluid (liquid) such as natural water, silicone oil or oil (oil having fluidity at temperatures below the temperatures at which is generated arc discharge, as a base material or an open container made of glass, ceramics or metal etc. containing the fluid may be placed in the area where the soot 9 scatters. In this case, arc jet is generated downward. As the fluid may be used a low-temperature cooling medium such as aqueous solution, dry ice, liquid nitrogen, liquid helium other than those described above.

The fluid-containing container is adapted to have a flow channel of closed system in which the fluid flows. A filtering member having a function for recovering soot 9 containing nanocarbon is placed in the flow channel. By such a structure, soot 9 can be recovered continuously, and more simple production method and apparatus using the same can be provided. Of course, a method can be adopted for purifying nanocarbon material comprising steps of; depositing soot on the surface of the fluid, purifying and filtering the fluid, and extracting and purifying to obtain a desired nanocarbon material. Also, a method can be adopted for purifying nanocarbon material comprising steps of; allowing soot to sediment in the fluid, purifying and filtering the fluid, and extracting and purifying to obtain a desired nanocarbon material. Alternatively, a method can be adopted for purifying nanocarbon material comprising steps of; dissolving soot in the fluid, purifying and filtering the fluid, and extracting and purifying to obtain a desired nanocarbon material.

In such cases, the base material may be formed from heat-resistant fine particles such as sand, glass, ceramics, metal, etc. Such heat-resistant fine particles are called "particulates". Further, a mixture of the above-described fluid (liquid) and the above-described heat-resistant fine particles may be used. In this case, a container as a holding member is a container for containing particulates, or for containing the fluid and particulates.

In the above-described examples, when the notch 4 is formed in the insulating plate 3, the direction of spout of the arc jet 5 can be defined. It is easy to control so that soot 9 deposits in a given area in high volumes. Arc discharge can be effectively performed between the cathode 1 and the anode 2. Thereby, the yields of carbon nanoparticles can be increased. It is easily determined by a sound generated at notch 4 whether or not arc jet 5 is formed. A cheap material can be used as a raw material, thereby extending the range of choices.

According to the present invention, there is provided a method and apparatus for preparing extremely easily a carbon nano-fine particle containing nanocarbon material such as carbon nanohorn, extremely short monolayer carbon nanotube, etc. Further, according to the present invention, there is provided an extremely short monolayer carbon nanotube as a novel nano carbon substance.

Obviously, many modifications and variations of the present invention are possible in the light of the above teachings. It is therefore to be understood that within the scope of the appended claims, the invention may be practiced otherwise than as specifically described.

We claim:

1. A method of preparing a carbon nano-fine particle comprising:
   placing a first electrode and a second electrode of carbon as a main component opposite each other through an insulating member having at least one notch;
   applying a voltage between the first electrode and the second electrode to generate arc discharge at the notch between the first electrode and the second electrode opposite each other in the atmosphere or air;
   evaporating the carbon material of the second electrode by the arc discharge to generate arc jet containing the carbon material from the notch; and
   cooling the arc jet to form soot containing a carbon nanomaterial.

2. A method of preparing a carbon nano-fine particle as defined in claim 1, wherein the carbon material of the second electrode is evaporated from an electrode point of the arc discharge.

3. A method of preparing a carbon nano-fine particle as defined in claim 1, wherein the carbon material of the second electrode is evaporated by the arc discharge while relatively moving the first electrode and the second electrode.

4. A method of preparing a carbon nano-fine particle as defined in claim 1, wherein said method further comprises recovering the soot containing the carbon nanomaterial.

5. A method of preparing a carbon nano-fine particle as defined in claim 4, wherein said method further comprises placing a substrate opposite to the arc jet to recover the soot containing the carbon nanomaterial through the substrate.

6. A method of preparing a carbon nano-fine particle as defined in claim 1, wherein the arc jet is generated while applying a magnetic field to the arc discharge.

7. A method of preparing a carbon nano-fine particle as defined in claim 1, wherein the arc discharge is performed while supplying a specific gas to the arc discharge.

8. A method of preparing a carbon nano-fine particle as defined in claim 7, wherein the specific gas is selected from the group consisting of rare gas, carbon-containing gas, oxygen gas, hydrogen gas, air, atmosphere and mixture thereof.

9. A method of preparing a carbon nano-fine particle as defined in claim 1, wherein the arc discharge is performed while cooling the first electrode and the second electrode.

10. An apparatus for preparing a carbon nano-fine particle comprises:
    a set of electrodes comprising a first electrode and a second electrode of carbon material as a main component which are held in a given space through an insulating member having at least one notch in the atmosphere or air;

an arc discharge generator for applying a voltage between the first electrode and the second electrode to generate the arc discharge by which the carbon material is evaporated to generate an arc jet containing the carbon material from the notch; and a recovering member for recovering soot containing the carbon nanomaterial formed by cooling the arc jet.

11. An apparatus for preparing a carbon nano-fine particle as defined in claim 10, wherein said apparatus further comprises a moving device for relatively moving the first electrode and the second electrode, and a voltage is applied between the first electrode and the second electrode while moving the first electrode and the second electrode to generate the arc discharge by which the carbon material is evaporated to generate soot containing carbon nanomaterial.

12. An apparatus for preparing a carbon nano-fine particle as defined in claim 10, wherein the recovering member comprises a substrate supported by a holder for subjecting the substrate to direct to the arc jet, and the soot containing the carbon nanomaterial is recovered through the substrate.

13. An apparatus for preparing a carbon nano-fine particle as defined in claim 10, wherein said apparatus further comprises a magnetic field applying member for applying a magnetic field to the arc discharge to generate the arc jet.

14. An apparatus for preparing a carbon nano-fine particle as defined in claim 10, wherein said apparatus further comprises a specific gas supplying member for supplying a specific gas to a generating area of the arc discharge.

15. An apparatus for preparing a carbon nano-fine particle as defined in claim 10, wherein said apparatus further comprises a cooling member for cooling the first electrode and the second electrode.

* * * * *